United States Patent
Hacherl

(10) Patent No.: US 6,324,571 B1
(45) Date of Patent: Nov. 27, 2001

(54) FLOATING SINGLE MASTER OPERATION

(75) Inventor: Donald J. Hacherl, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,774

(22) Filed: Sep. 21, 1998

(51) Int. Cl.$^7$ .................................................. G06F 15/16
(52) U.S. Cl. .................. 709/208; 709/201; 709/204; 709/209; 707/100; 707/103; 707/104; 705/9
(58) Field of Search .................................. 709/201, 204, 709/208, 209; 707/100, 103, 104; 705/9

(56) References Cited

U.S. PATENT DOCUMENTS

| | | | | |
|---|---|---|---|---|
| 5,410,691 | * | 4/1995 | Taylor | 395/600 |
| 5,867,688 | * | 2/1999 | Simmon et al. | 395/500 |
| 5,884,322 | * | 3/1999 | Sidhu et al. | 707/200 |
| 5,956,718 | * | 9/1999 | Prasad et al. | 707/10 |

OTHER PUBLICATIONS

Steedman, D., *X.500 the directory standard and its application*, Technology Appraisals, 1993, 1–165.

Solomon, D.A., "The Official Guide to the Architecture and Internals of Microsoft's Premier Operating System", *Inside Windows NT® Second Edition*, Microsoft® Press, 1998 Not Considered. FF \* cited by examiner Primary Examiner—Mark H. Rinehart
Assistant Examiner—Farzaneh Farahi
(74) Attorney, Agent, or Firm—Woodcock Washburn Kurtz Mackiewicz & Norris LLP

(57) ABSTRACT

A system for switching exclusive authority to perform a predefined system-wide task between machines in a network comprises: a database having an attribute for identifying a master server in the domain to exclusively perform the predefined network-wide task. The database is replicated on each of the servers in the domain. The attribute may be changed so as to change the master server to another one of the servers in the domain. While multiple servers in the network may be physically capable of performing the predefined system-wide task, at any one time only one server may be designated as the master server. The master server role may, however, be "floated" among various servers in the network. At any particular moment, the machine which currently holds the master server role is referred to as the master server role owner and is identified in an attribute, role owner, that is stored on each server in the network. Switching authority to perform a particular network-wide task requires updating the attribute on each of the servers in the network.

24 Claims, 9 Drawing Sheets

FLOATING SINGLE MASTER OPERATION

CROSS REFERENCE TO RELATED APPLICATIONS

This application is related by subject matter to the inventions disclosed in commonly assigned U.S. patent application Ser. No. 09/157,772, filed on Sep. 21, 1998, entitled "Multi-Master Unique Identifier Allocation."

TECHNICAL FIELD

The present invention relates generally to distributed computer systems, and more particularly to a system for dynamically allocating exclusive authority for performing network-wide tasks among different computers in a network.

BACKGROUND OF THE INVENTION

Generally, in distributed computer operating systems, there are particular network-wide tasks that are best performed by a single server machine rather than multiple servers. For example, generating unique identifiers and updating the domain name space of a directory service are tasks that have traditionally been performed by pre-designated single master servers.

Most proposed multi-server alternatives to the single server design have proven too complex to be practicable. Multi-sever designs require synchronizing the efforts of multiple machines; this is difficult to achieve and even harder to maintain. Further, in multi-server systems when a server becomes out-of-sync with the other servers, conflicts arise between servers, many of which cannot be gracefully resolved. By comparison, designating a single machine to perform a particular network-wide task is much simpler and avoids the complications and conflicts associated with multi-server designs.

Thus, in existing computer operating systems, it is common for a network task to be performed by a single pre-designated master server. In such systems, the remaining network servers are pre-configured to refer to the pre-designated master server whenever the particular network task need be performed.

Single server designs, however, do have limitations. For example, complications may result in pre-defined single master server configurations when the master server crashes or otherwise becomes unavailable to the other servers on the network. In such situations, the remaining network machines cannot perform the function that the master server is designated to provide. Thus, the absence of a master server that is exclusively responsible for a system critical task can cripple a network and all machines connected to it. Even when the master server's absence from the network is scheduled, as in the case of system maintenance, a new server needs to be promoted to master and the remaining servers on the network re-configured, typically by manual means, to communicate with the new master.

Thus, there is a need in the art for a distributed computing system wherein although any of a number of servers in the network has the physical capacity to perform a particular network task, at any given time only one server has exclusive authority to perform the task. Exclusive authority to perform the task should be easily transferred between machines, however, so as to avoid the limitations of prior single server designs. Upon transfer to a new machine of the authority to perform the network-wide task, the remaining servers in the network should be automatically notified of the change.

SUMMARY OF THE INVENTION

Briefly, the present invention provides a system for switching exclusive authority to perform a particular system-wide task between machines in a network. While multiple servers in the network may be physically capable of performing a particular system-wide task, at any one time only one server may be designated with authority to actually perform the task. This authority may, however, be "floated" among various servers in the network. At any particular moment, the machine which currently holds authority to perform a particular task is referred to as the master server role owner and is identified in an attribute (called, for example, "role owner") that is stored on each server in the network. Switching authority to perform a particular network-wide task requires updating the attribute on each of the servers in the network.

In a described embodiment, the role owner attribute identifying the master server is stored in a directory service used by machines in the network to locate named resources. Updates to the role owner attribute are implemented using the replication features of the directory service.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF THE INVENTION

The present invention provides a distributed computing system wherein exclusive authority for performing a particular network-wide task exists at any one time with one server. For example, serving as an e-mail gateway, operating as a network print server, generating unique identifiers, updating a directory service schema, and updating the domain name space of a directory service are all tasks which might be implemented using the inventive computing system. Although multiple server machines in a network may be capable of performing a particular network-wide task, at any particular moment, only one machine is designated as the master server with exclusive authority to perform the task.

The master server for a task can be changed or "floated" to other servers in the system and the remaining servers automatically notified of the change. Accordingly, the present invention is said to provide a system for "floating single master operations" (FSMO).

The server that is operating as the master server with respect to a particular task, or performing the "role" of master server, is identified by a "role owner" attribute stored on each of the various servers in the network. Thus, the server with exclusive authority to perform a particular network-wide task may be referred to as a FSMO role owner. The role owner attribute provides a means for each network server to identify the current FSMO role owner. Floating or changing the FSMO role owner to another server in the network entails changing the role owner attribute on each network server. In an embodiment described in detail below, the attribute is stored in a database that is replicated on each server in the system. Updates to the attribute are performed using replication updates between servers.

It should be noted that there are many network-wide tasks that are candidates for being implemented as floating masters. Indeed, there are likely to be multiple FSMO roles in a network, each with its own network task to perform, and each with a separate attribute stored on each server in the network. Also, it should be understood that one physical machine may be the owner of multiple FSMO roles, i.e. one physical machine may perform many network-wide tasks.

Prior to explaining the details of the invention, it is useful to provide a description of a suitable exemplary environment in which the invention may be implemented.

EXEMPLARY OPERATING ENVIRONMENT

1. A Computer Environment

Figure 1:
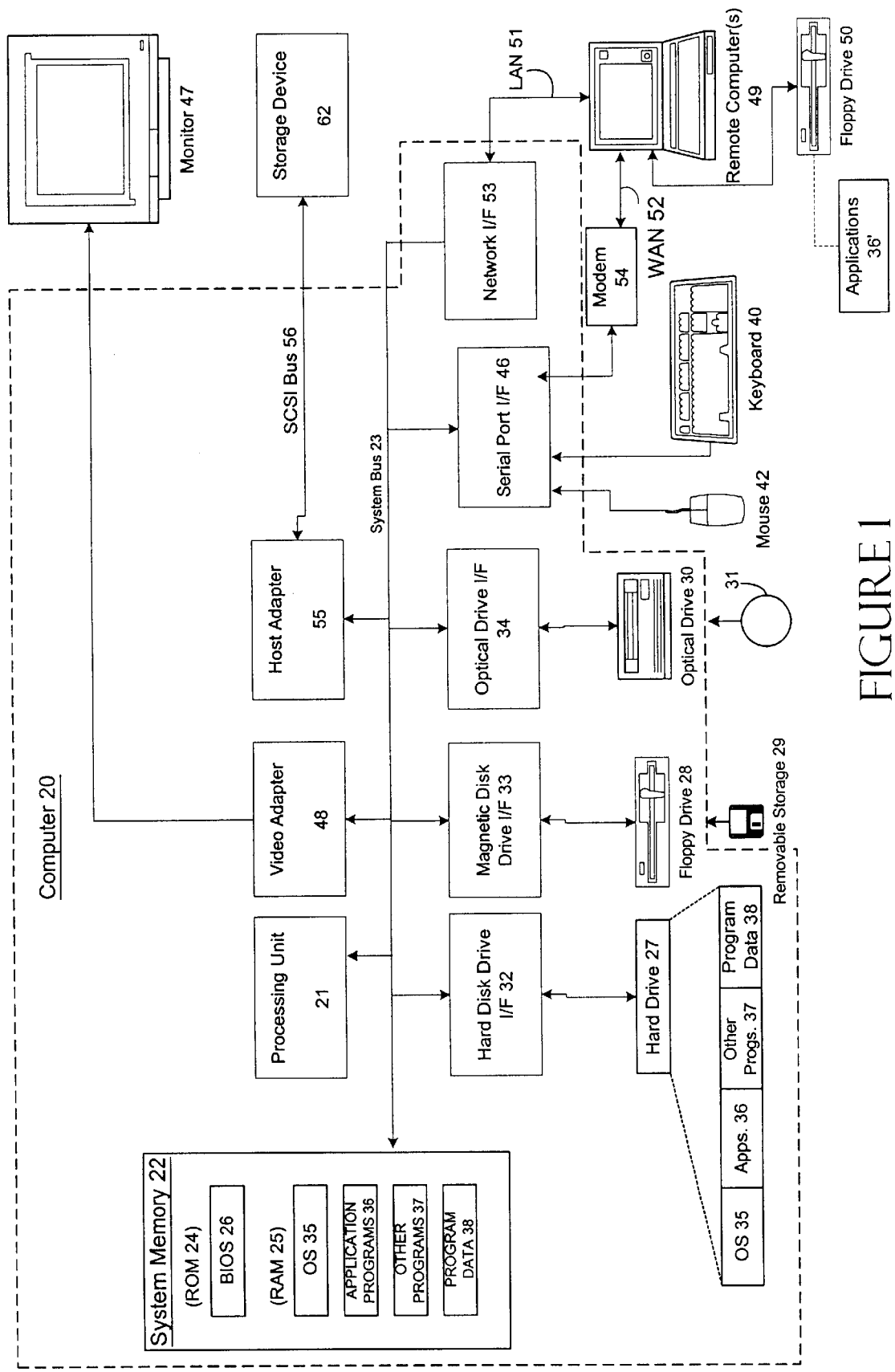
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CDROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
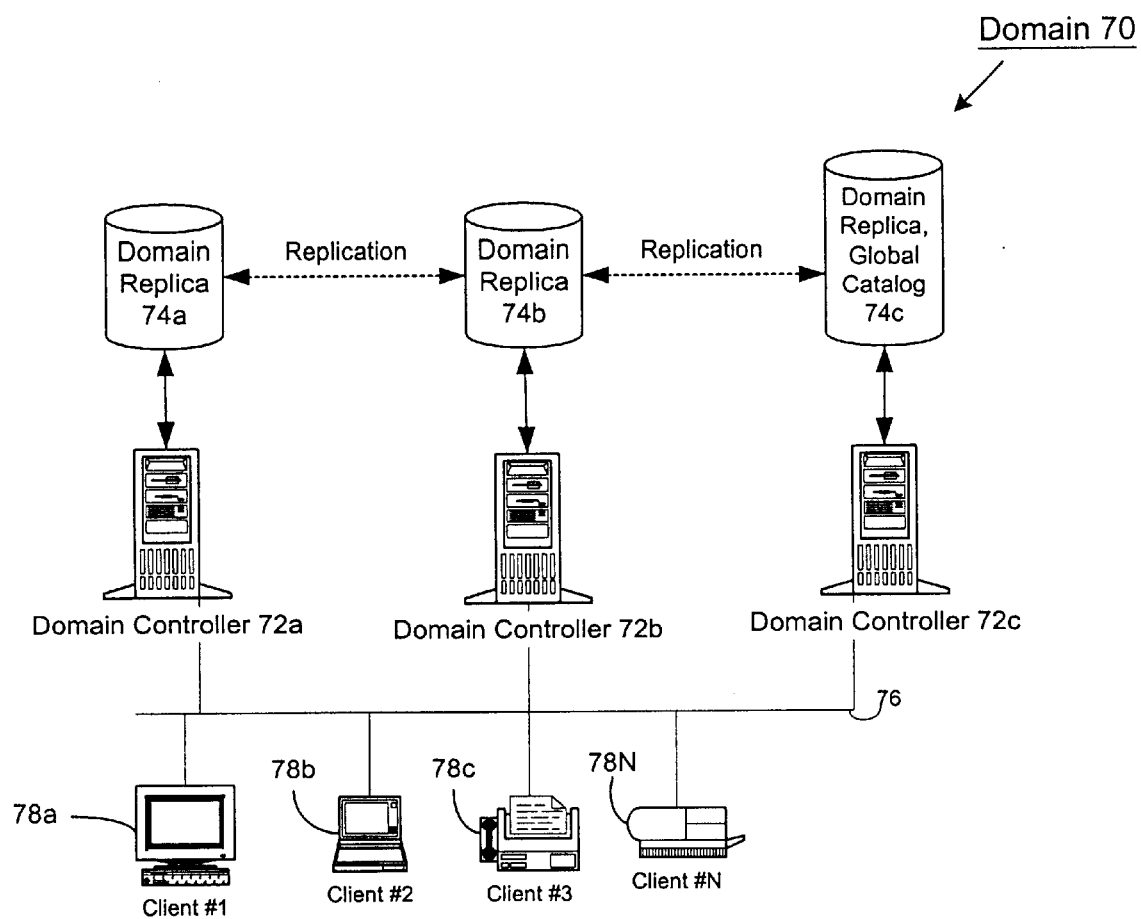
FIG. 2 is schematic diagram representing a network domain in which aspects of the present invention may be incorporated.

As noted, the computer described above can be deployed as part of a computer network. In general, the above description applies to both server computers and workstation computers deployed in a network environment. FIG. 2 illustrates an exemplary network environment in which the present invention may be employed. FIG. 2 shows a network of workstation and servers organized in an exemplary organizational unit domain 70, where the domain presents a common security boundary within a network. As shown, it includes a plurality of servers 72a, 72b and 72c, which are configured as domain controllers and include a corresponding replica 74a, 74b and 74c, respectively, of a directory maintained by the domain. The function of the directory is described in further detail below in connection with FIG. 3. The domain controllers are interconnected by a bus 76, which in turn couples various clients including workstation 78a, notebook 78b, facsimile machine 78c, printer 78N, and so on to the domain controllers.

As shown in FIG. 2, the domain 70 provides multi-master replication, meaning that all replicas of a given partition are writeable. This allows updates to be applied to any replica of a given partition. The directory replication system propagates the changes from a given replica to all other replicas. In the past, it had been common to employ two kinds of domain controllers: Primary domain controllers (PDCs) and backup domain controllers (BDCs), where the PDCs held a read/write copy while the BDCs held a read-only copy. In the example of FIG. 2, all domain controllers for the domain are considered peers in that each holds a writeable copy of the directory.

As noted above, the network domain maintains a directory that is accessible over the network. The provision of directory information on the network is typically called a directory service. The directory service component of a distributed computing environment is intended to make it easier to find information. A directory service is like a phone directory. Given a name for a person or a resource, it provides the information necessary to access that person or resource. Administrators, users, and applications can find information about people, printers, files, and other shared resources in a single place even if the resources reside on many different physical servers. The directory may be viewed as a distributed database of information about objects, including people, organizations and processes. Objects are assigned to logical workgroups or other organizational units rather than to individual servers. This location independence is fundamental to making distributed computing simple to use and easy to manage. It is even possible to define standard interfaces to the directory so that other directories can integrate with it. In fact, the directory can present information from multiple sources as a single system directory object.

Figure 3:
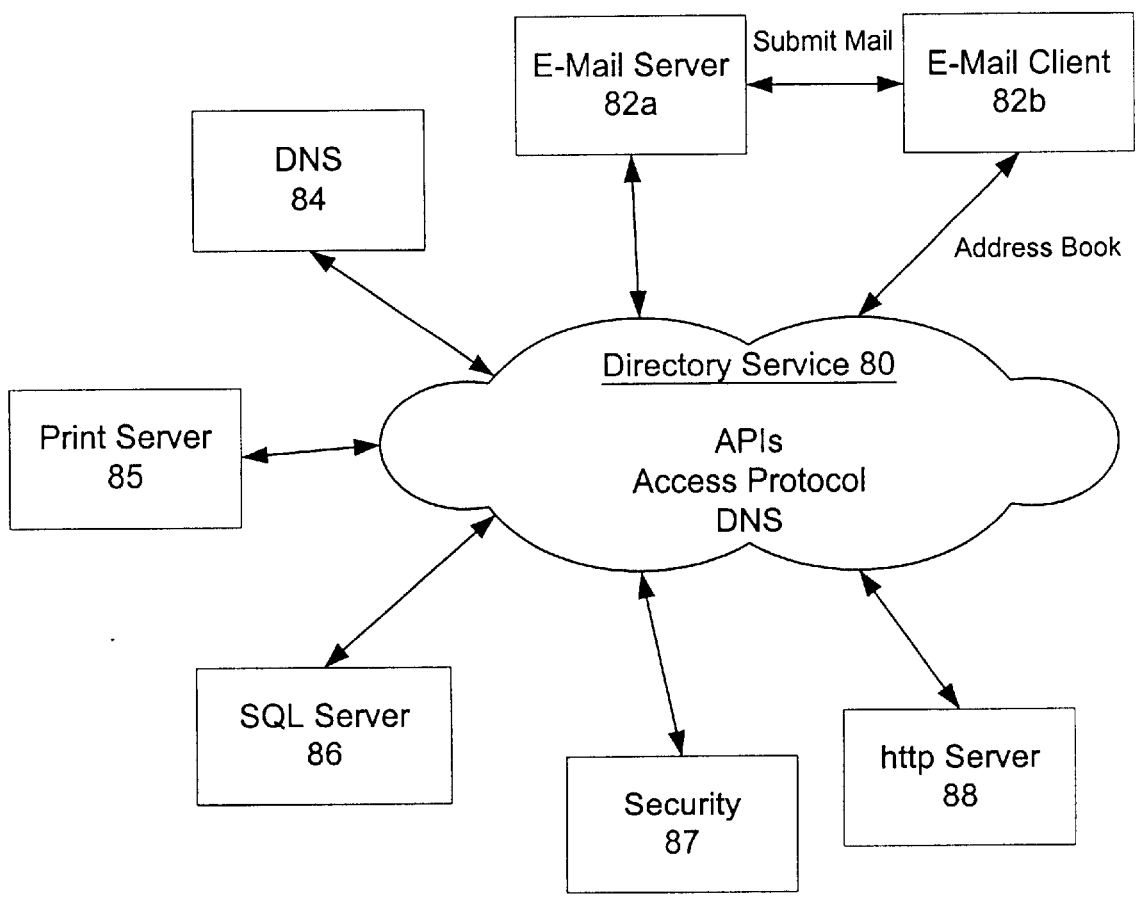
FIG. 3 is a block diagram of a directory service that operates in a network environment and in which aspects of the present invention may be incorporated.

FIG. 3 schematically depicts how a directory service 80 provides a logically centralized location for finding shared resources. Such shared resources may include, e.g., an e-mail server 82a or address book for use by an e-mail client 82b, the Domain Name System (DNS) 84 (the locator service used on the Internet), a print server 85, a database (e.g., SQL) server 86, a security server 87, and an http server 88. One protocol for directory access is the industry-standard LDAP (Lightweight Directory Access Protocol), which allows for extensive interoperability with directory services from multiple sources. The directory service 80 insulates users and administrators from having to navigate the physical structure of the network.

The directory service 80 may make use of the features of DNS and the OSI X.500 directory standard (also known as ISO 9594). For example, since DNS may be used as a global backbone namespace, the directory service may use DNS to look up LDAP services. In addition, multiple application programming interfaces (APIs), such as MAPI and LDAP C may be employed to facilitate the writing of directory-enabled applications that access the directory.

Most enterprises already have many different directories in place. For example, network operating systems, electronic mail systems, and groupware products often have their own directories. Many issues arise when a single enterprise deploys multiple directories. These issues include usability, data consistency, development cost, and support cost, among others. It is common to find a variety of directories (many playing an administrative role) deployed within a single organization. The goal of a directory service such as that discussed above is to provide a single, consistent set of interfaces for managing and using multiple directories. A directory service differs from a directory in that it is both the directory information source and the services making the information available and usable to the users.

A directory of the kind provided by the directory service 80 is, or may be viewed as, a namespace, i.e., a bounded area in which a given name can be resolved. Name resolution is the process of translating a name into some object or information that the name represents. For example, a telephone book forms a namespace in which the names of telephone subscribers can be resolved to telephone numbers. Likewise, the directory service 80 provides a namespace in which the name of an object in the directory can be resolved to the object itself. (An "object" is a distinct, named set of attributes that represents something concrete, such as a user, a printer, or an application. The attributes hold data describing the thing that is identified by the directory object. Attributes of a user might include the user's given name, surname, and e-mail address.)

Figure 4:
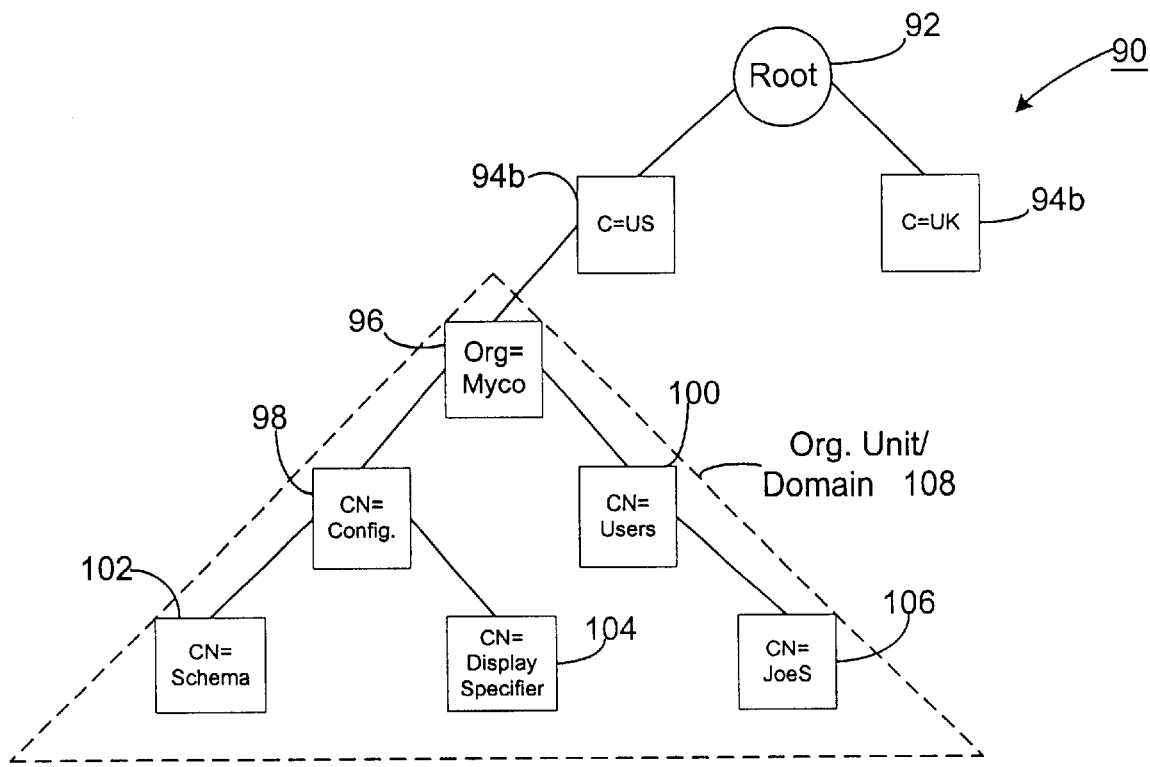
FIG. 4 is a directory tree diagram showing further details of the arrangement of the directory service of FIG. 3.

FIG. 4 depicts an exemplary hierarchical namespace 90. This namespace includes a root 92 and a tree comprising a hierarchy of objects and containers. (A container is like an object in that it has attributes and is part of the namespace. However, unlike an object, it does not represent something concrete. It is used to hold or organize a group of objects and/or other containers.) Endpoints on the tree are usually objects. Nodes or branches are containers. A tree shows how objects are connected or the path from one object to another. A simple directory is a container. A computer network or domain is also a container. The namespace of FIG. 4 includes two country nodes 94a and 94b (corresponding to country=U.S. and country=U.K., respectively), and a sub-tree under node 94a comprising nodes 96 (organization=Myco); nodes 98 and 100 (common name=config. and common name=Users, respectively); and nodes 102, 104 and 106 (common name=Schema, Display Specifier and JoeS). As indicated in FIG. 4, node 96 and its children nodes may be viewed as an organizational unit 108, which is also called a "domain". The organizational unit/domain is served by a closely coupled set of servers, or domain controllers.

As noted above, a domain is a single security boundary of a computer network. The directory is made up of one or more domains. On a standalone workstation, the domain is the computer itself. A domain can span more than one physical location. Every domain has its own security policies and security relationships with other domains. When multiple domains are connected by trust relationships and share a common schema, configuration, and global catalog, they make a domain tree.

In the exemplary network, the directory service is replicated, i.e. copies of a given set of directory service data is distributed to multiple domain controllers. For purposes of replication, the directory tree is logically broken into contiguous blocks called "naming contexts." Every directory service object is located in precisely one naming context. The particular naming context to which an object belongs is dictated by the object's position in the directory tree.

A domain controller is configured to hold a replica of some set of naming contexts. Thus, a domain controller holds a copy of every object inside the set of naming contexts, and holds no other objects. Each domain controller holding a particular naming context is configured to replicate that naming context to and from a particular set of other domain controllers. Thus, replication in the network can be described in terms of simple, unidirectional, replication agreements. For example, a replication agreement might define that a first domain controller replicate a specific naming context from a second domain controller. This replication agreement defines what data the first domain controller replicates and from where it replicates it. Each domain controller knows of only those few replication agreements in which it participates.

In the replication process of the exemplary network, replication operates on a "pull model." According to this model, for the above replication agreement, the first domain controller sends a request for replication to the second domain controller. The second domain controller returns the replication data for the specific naming context defined in the replication agreement in a reply message to the first domain controller. Thus, the pull model requires that replication result from a request by one domain controller to another to forward the latest version of a set of objects. This is contrasted with a "push" model where data is replicated to a machine without there having been a request beforehand.

Generally, a domain controller replicates data at scheduled intervals. As used herein, "scheduled replication" refers to the process whereby at predetermined scheduled intervals a domain controller requests replication for a naming context from each domain controller in its predefined set of domain controllers from which it is configured to replicate. Data may also be replicated outside the replication schedule on an urgent or immediate basis. For urgent replication transactions, a request is made to a single domain controller in response to a notification from that domain controller indicating that there has been an update to an object which should be replicated outside of the set replication schedule. Thus, as used herein "urgent replication" refers to a process wherein a message indicating an object has been updated is first received from another domain controller. Thereafter, a replication request is sent to that domain controller requesting the appropriate updated data. After a packet is successfully applied, the destination server will update its local copy of the agreement with the source's current update number, so that it will not continuously fetch the same changes.

In the exemplary network, objects and not actions are replicated. Thus, the data transmitted in a replication procedure consists of updated objects, as opposed to a collection of changes to be applied, that are to be used in overwriting objects on the destination domain controller.

DETAILED DESCRIPTION OF FLOATING SINGLE MASTER OPERATIONS

Figure 5:
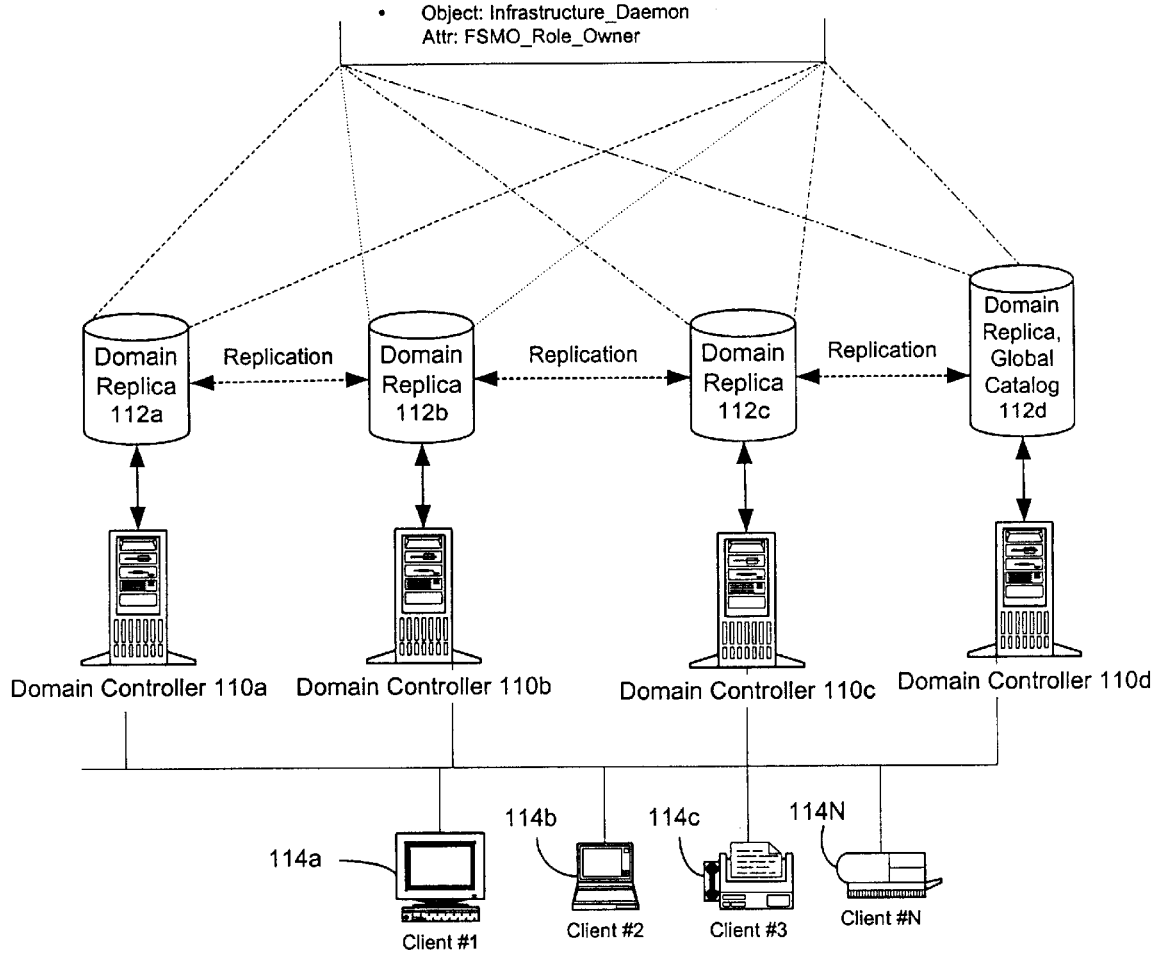
FIG. 5 is a diagram of an illustrative network in which the present invention might operate.

FIG. 5 provides an illustrative diagram of a network in which the present invention might operate. Four server machines, 110a, 110b, 110c, and 110d, which are configured as domain controllers are connected in a network. Any one of domain controllers 110a, 110b, 110c, or 110d has the physical capacity, i.e. the necessary software and computing power, to perform a particular network-wide task such as for example, serving as an e-mail gateway, operating as a network print server, generating unique identifiers, updating a directory service schema, and updating the domain name space of a directory service. However, only one of the domain controllers, for example domain controller 110a, may be designated to perform a particular network task at any one particular time. An attribute, "role owner," identifies the domain controller that currently owns the role of master server with respect to a particular network-wide task. The role owner attribute is stored in databases 112a, 112b, 112c, and 112d, one of which exists on each of domain controllers 110a, 110b, 110c, and 110d. Thus, if domain controller 110a is designated to perform a particular network-wide task, the role owner attribute stored in each of databases 112a, 112b, 112c, and 112d will identify domain controller 110a as the current role owner.

The role of master server may be floated to another domain controller in the network by changing the role owner attribute in databases 112a, 112b, 112c, and 112d. For example, if domain controller 110a has been designated to perform a network-wide task, domain controller 110c can be designated the master server by changing the role owner attribute on each of domain controller 110a, 110b, 110c, and 110d.

An exemplary embodiment of the present invention may be implemented in the Microsoft® "WINDOWS NT®" operating system, particularly version 5.0 which comprises a directory service, called "Active Directory" which is consistent with the directory service described above in the exemplary environment section. Notwithstanding, there is no intention to limit the present invention to Windows NT® and/or the-Active Directory architecture, or even to networks, but on the contrary, the present invention is intended to operate with and provide benefits with any operating system, architecture and/or mechanisms that install applications.

In accordance with the exemplary embodiment, the directory service is replicated. Thus, a local copy of the directory service exists on each domain controller in the network. Updates made in a local copy of the directory service on one domain controller are made in the local copies of the directory service on each of the remaining domain controllers in the network using replication procedures. As described above in the exemplary operating environment section, replication may be performed at scheduled time intervals or in some instances on an urgent or immediate basis.

According to the exemplary embodiment of the present invention, the role owner attribute for identifying the current FSMO role owner is stored in the directory service database. Thus, databases 112a, 112b, 112c, and 112d of FIG. 5 are replicas of the directory service for a particular domain. Updates of the role owner attribute between replicas of the directory service are made via replication.

In the exemplary embodiment, at least five network tasks may be implemented using FSMO roles. It is understood, however, that other network tasks may also be implemented using FSMO roles. The five exemplary FSMO roles include the following:

(1) Schema Master—The Schema Master performs updates to the directory services schema. There is one schema master per directory;

(2) Domain Naming Master—The Domain Naming Master has exclusive authority to make changes to the domain name space of the directory service. For instance, it can add a new domain, or remove an existing domain. The Domain Naming Master can also add or remove cross-references to external directories. There is one Domain Naming Master per directory;

(3) RID Master—The RID Master is responsible for allocating pools of unique relative identifiers (RIDs) to domain controllers. A complete description of the RID Master is provided in co-pending U.S. patent application Ser. No. 09/157,772 entitled "Multi-Master Unique Identifier Allocation", the contents of which are incorporated by reference in their entirety. There is one RID master per domain in a directory;

(4) PDC Advertiser—The PDC Advertiser performs tasks necessary to support servers and clients which are running earlier versions of "WINDOWS NT®". In prior versions of "WINDOWS NT®", clients always perform certain tasks at one domain controller, the primary domain controller (PDC). For instance, changing a password in earlier versions of "WINDOWS NT®" involves communicating with the PDC. The PDC Advertiser advertises itself as the PDC in order to support clients running prior versions of "WINDOWS NT®". There is one PDC advertiser per domain in the directory; and (5) Infrastructure Daemon—The Infrastructure Daemon is responsible for updating domain security identifiers (SIDS) and domain names (DNs) in cross-domain object references. There is one Infrastructure Daemon per domain in a directory.

Each of the above is a FSMO role which designates exclusive authority to perform a particular network task. For each of these FSMO roles, there is a system object in the directory service for holding attributes relevant to the particular FSMO role. For purposes of this explanation, these five objects are referred to as follows: Schema_Master; Domain Naming_Master; RID Master; PDC_Advertiser; and Infrastructure_Daemon. As previously noted, in the exemplary embodiment, the role owner attribute that was explained previously as identifying the current owner of a particular FSMO role is stored in the directory service. In particular, a FSMO_Role_Owner attribute is stored on each of the above five objects to identify a particular domain controller in the network which is currently performing the particular task.

In the exemplary embodiment, the directory service is distributed to each domain controller in the network. Thus, each server has a copy of each of the role owner attributes (as shown in FIG. 5) for each FSMO Master object and can therefore identify the particular server machine on the network which is the FSMO role owner for a particular task. When any one machine in the network needs to make a request to a particular role owner, reference is made to the machine's local copy of the role owner attribute to ascertain which network machine the request should be made upon.

Of course, circumstances may arise where it may be necessary to change the role owner for a particular task from one domain controller to another. This may be necessary, for example when the current FSMO role owner is scheduled for maintenance. In such a situation it would be appropriate to transfer the FSMO role to another domain controller in the network prior to bringing down the current FSMO role owner.

Figure 6:
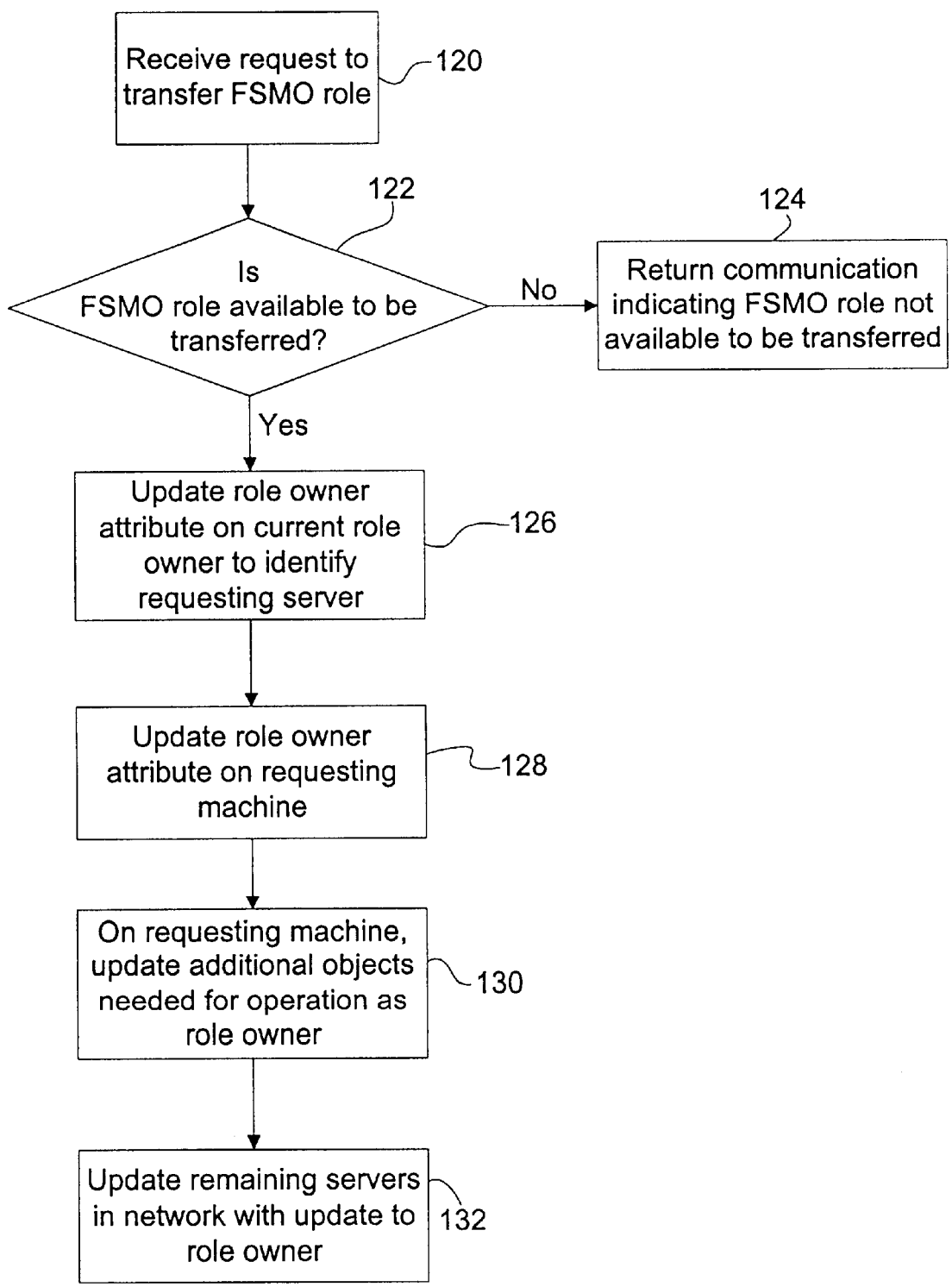
FIG. 6 is a flow diagram of a process in accordance with the present invention of floating a FSMO role from one machine to another.

FIG. 6 provides a flow diagram of the steps involved in floating a FSMO role from one machine to another. At step 120, the requesting server issues and the current role owner receives a requests that a particular FSMO role be transferred from the current role owner to the requesting machine. In the exemplary embodiment, the request is made via the operating system's replication functionality. Specifically, the request is made using urgent replication as previously described in the exemplary environment section.

If, at step 122 the current role owner is not available to be transferred, at step 124 a communication to that effect is returned to the requesting server. A role owner machine might not be available for transfer for many reasons including the machine is busy performing its FSMO role or the machine has simply crashed. In such situations, transfer of role ownership via normal means is not appropriate. If, however, the current role owner is available for transfer, at step 126 the role owner attribute stored in the local copy of the directory services database located on the current role owner is updated to identify the requesting server.

At step 128, the role owner attribute is updated in the local copy of the directory services database located on the requesting server to identify the requesting server as the new role owner. At step 130 any objects that the requesting server will need in order to perform its newly assumed role as master server are also updated in the requesting server's local copy of the directory service. In the exemplary embodiment, updates to the role owner attribute and any related objects in the requesting server's local directory service are made using urgent replication.

At step 132, the remaining servers in the network are updated via scheduled replication with the change in master role owner. As a consequence, there may be a delay between the transfer of the FSMO role ownership and updating the remaining servers in the network with the change in role ownership. This delay may give rise to the situation where a server which has not been updated with the new role owner information, issues a request to the former role owner. When this situation arises, the former role owner informs the requesting server that the role ownership has been transferred.

The FSMO role transfer process might best be explained by example. Referring back to FIG. 5, assume that domain controller or server 110a has been designated the RID Master owner. Thus, the FSMO_Role_Owner attribute in the RID_Master object stored in the directory service identifies domain controller 110a as the RID master. If it is desired to transfer or float RID Master role ownership to domain controller 110c, domain controller 110c replicates a role transfer request to domain controller 110a. If domain controller 110a is available to transfer ownership of the RID Master role, the FSMO Role Owner attribute of the RID Master object stored in the local copy of the directory service database located on domain controller 110a is updated to identify domain controller 110c as the RID Master role owner. Thereafter, the RID_Master object with an updated FSMO_Role_Owner attribute as well as the complete RID pool, or the entire set of outstanding RIDs, is replicated via urgent replication to the local copy of the directory service located on domain controller 110c. The FSMO_Role_Owner attribute is updated in the remaining domain controllers 110b and 110d upon scheduled replication.

It should be noted that several of the other FSMO roles in the exemplary embodiment similarly require updating attributes and objects other than the FSMO_Role_Owner upon transfer of the role. In particular, for the Schema Master role, any objects in the schema container, which holds objects related to the operation of the schema, that the recipient domain controller does not have the most current version of, are replicated along with the updated FSMO_Role_Owner attribute to the new role owner. For the Domain Naming Master, any objects in the partitions container, which holds objects related to the naming contexts in the directory service, that the recipient domain controller does not have the most current version of, are transferred to the new role owner. For the PDC Advertiser Master, any objects in the infrastructure container, which holds objects related to objects which have been moved between domains, that the recipient domain controller does not have the most current version of, are transferred to the new role owner. For the Infrastructure Daemon Master, generally, only the updated FSMO_Role Owner is transferred to the recipient domain controller.

Figure 7:
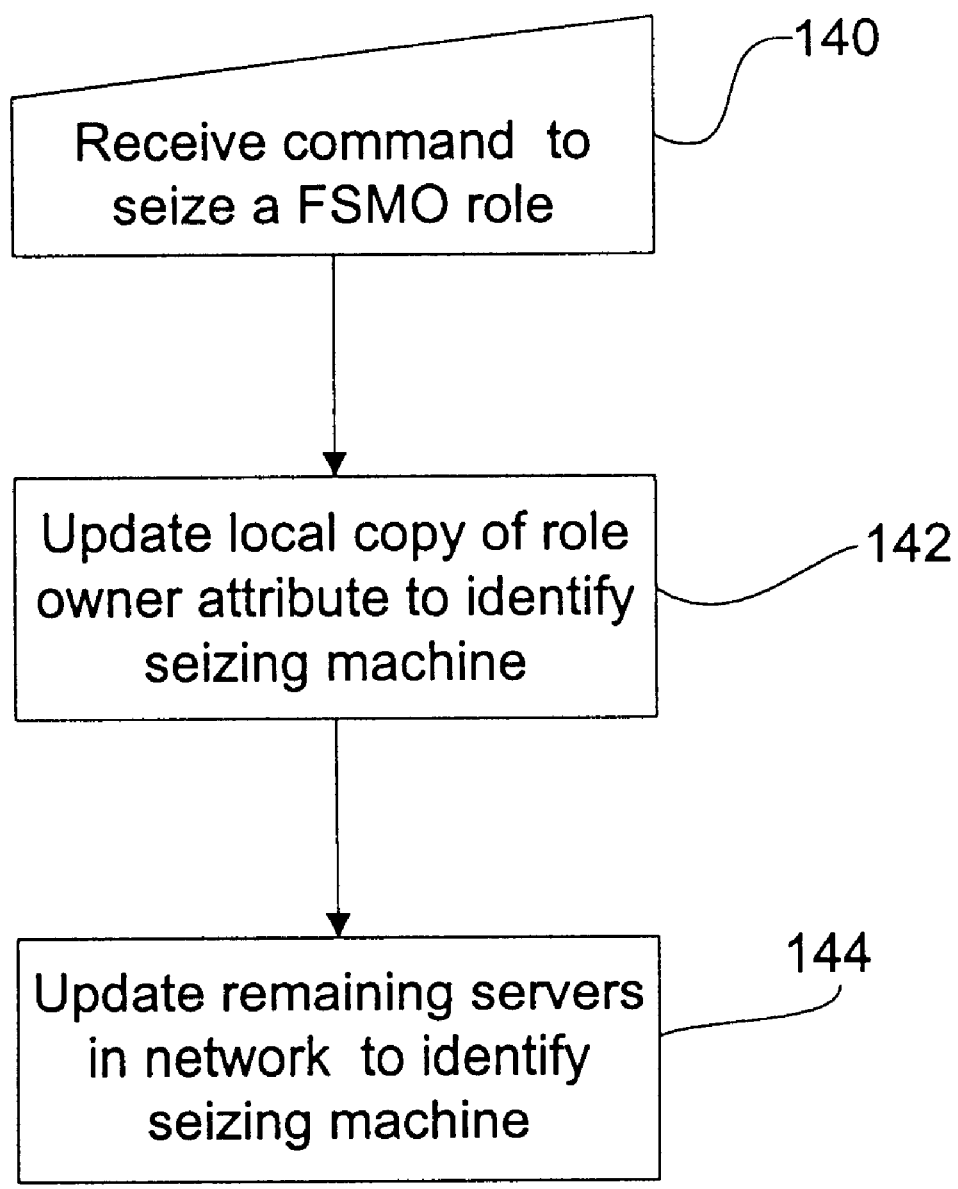
FIG. 7 is a flow diagram of a process in accordance with the present invention of seizing a role.

Situations arise where FSMO role transfer is not appropriate and role seizure is necessary. For example, if the current FSMO role owner has crashed, it may be necessary for continued system operation to promote another domain controller in the network to role owner. FIG. 7 provides a diagram of the role seizure process. As shown, at step 140, a command is issued by a system administrator or other similarly qualified person to a particular domain controller to seize a particular FSMO role. In response to the command, at step 142, the role owner attribute located locally on the particular domain controller is updated to identify the domain controller as the FSMO role owner. At step 144, the remaining servers in the network are updated to identify the new role owner. As noted above, these updates are made using the replication features of the directory service. Preferably, for security reasons the role seizure operation may be performed only at the domain controller which is being promoted to FSMO role owner.

The process of master role seizure may also be explained by way of example. Referring again back to FIG. 5, assume that domain controller 110a is the current RID Master. Thus, in local copies 112a, 112b, 112c, and 112d of the directory service located on servers 110a, 110b, 110c, and 110d, the FSMO_Role_Owner attribute on the RID_Master object identifies domain controller 110a. Assuming that domain controller 110a goes off-line for some reason, it may be necessary to promote one of remaining domain controllers 110b, 110c, or 110d to RID Master so that pools of RIDs can continue to be distributed in the system. Thus, a system administrator, logged on from domain controller 110c, may issue a command to domain controller 110c to seize the RID Master role. As a consequence, the FSMO_Role_Owner attribute on the RID_Master object in local copy 112c of the directory service located on domain controller 110c is immediately updated to identify domain controller 110c. Thereafter, remaining local copies 112b and 112d of the directory service located on domain controllers 110b and 110d are updated via scheduled replication procedures.

Figure 8:
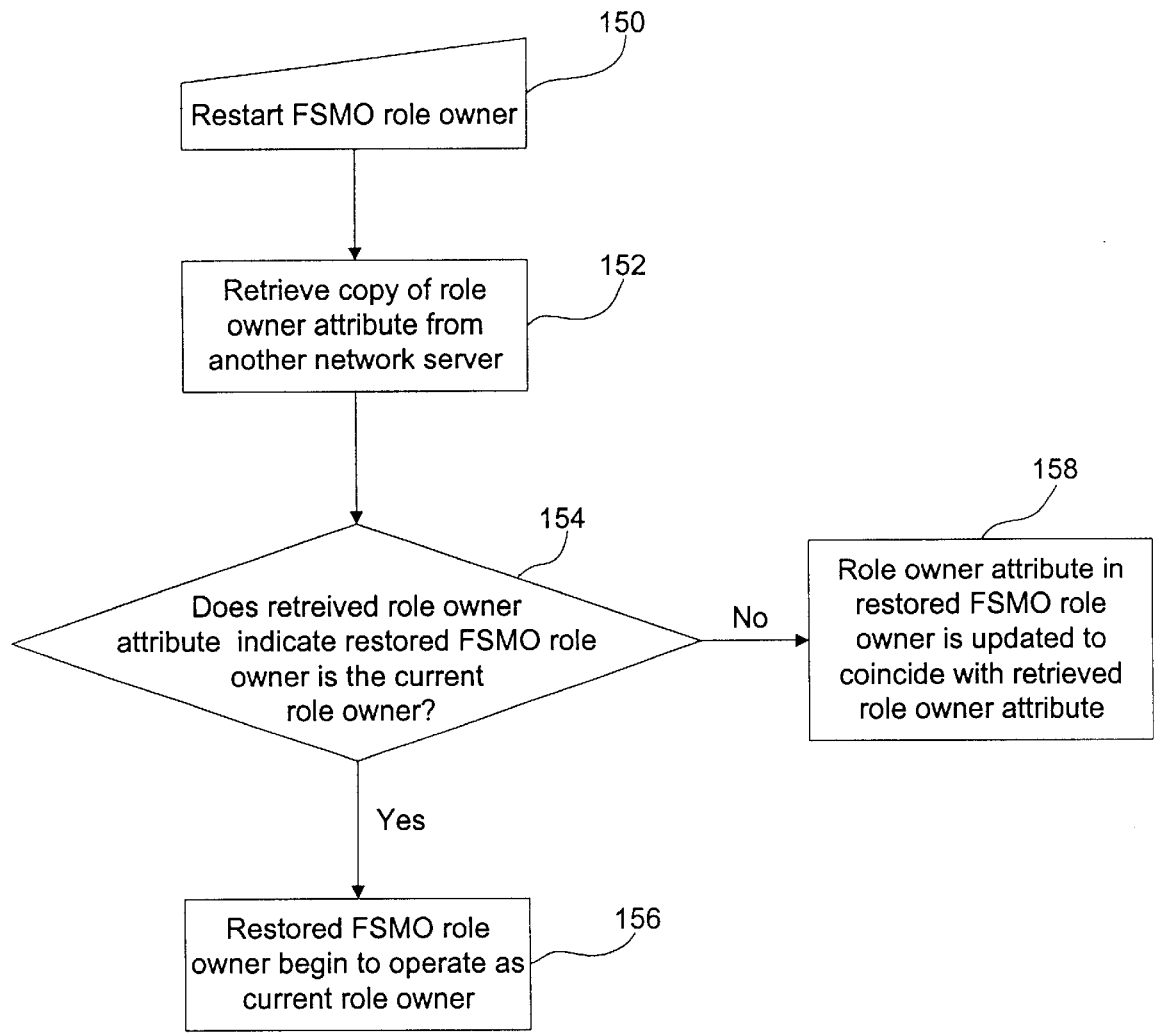
FIG. 8 is a flow diagram of a process in accordance with the present invention of restoring a FSMO role owner.

A FSMO role owner that has gone off-line either because it crashed or for scheduled maintenance, may be returned to the network. In such situations, it is necessary to account for any changes in FSMO role ownership that may have been instituted while the FSMO role owner was off-line. For instance, another server may have been promoted to role owner while the original FSMO role owner was off-line. FIG. 8 provides a flow diagram for restoring a FSMO role owner. At step 150, the FSMO role owner domain controller is restarted. The domain controller recognizes that its local copy of the directory service indicates that it is a FSMO role owner. Before beginning to operate as the master role owner, however, the restored domain controller verifies with other domain controllers that it is to continue to operate as the master role owner. Therefore, once the role owner has been restored and is communicating on the network, at step 152, the role owner attribute for the particular FSMO role master object is replicated in from another domain controller in the network. Generally, the attribute may be replicated from any domain controller in the network. If at step 154, it is determined that the replicated role owner attribute identifies the restored domain controller as the role owner, at step 156 the restored domain controller begins to operate as the role owner. If, however, at step 154 the replicated information identifies another domain controller in the network as the role owner, the role owner attribute on the restored domain controller is updated to coincide with the replicated information.

It should be noted that whether the restored domain controller re-assumes the master role or abandons the role depends entirely upon the information that is replicated in from a randomly selected domain controller in the network. Therefore, if while a FSMO role owner is off-line, another domain controller in the network is promoted to role owner, it is important that the change in role ownership is made known to all the other domain controllers in the network. If all of the domain controllers in the network are updated with this changed role owner attribute, there is no chance that the restored former FSMO role owner will replicate information which would cause it to re-initiate as a FSMO role owner. Of course, if care is not taken to assure that all of the network domain controllers are updated with all changes in role ownership, the possibility arises that the restored FSMO role owner could attempt to re-initiate activity as a FSMO role owner when in fact another FSMO role owner already exists in the network. Thus, the importance of allowing changes in role ownership to replicated throughout the system prior to restoring a FSMO role owner should not be under emphasized.

Again, the process of restoring a FSMO role owner may be explained by way of example. Referring again back to FIG. 5, assume that domain controller 110a is the current RID Master. Thus, in local copies 112a, 112b, 112c, and 112d of the directory service located on domain controllers 110a, 110b, 110c, and 110d, the FSMO_Role_Owner attribute on the RID_Master object identifies domain controller 110a. Domain controller 110a thereafter goes off-line. While domain controller 110a is off-line, domain controller 110c is promoted to RID Master. As a result of this promotion, local copies 112c, 112b, and 112d of the directory service located on domain controllers 110c, 110b, and 110d are updated to have the FSMO_Role_Owner attribute on the RID_Master object identify domain controller 110c. Thereafter, when domain controller 110a is re-started, the FSMO_Role_Owner attribute on the RID_Master object in local copy 112a of the directory service indicates that domain controller 110a is the RID Master. Prior to beginning operation as the RID Master, however, domain controller 110a replicates in the FSMO_Role_Owner attribute on the RID_Master object from one of the other domain controllers, 110b, 110c, or 110d. In this example, the value for the FSMO_Role_Owner attribute on the RID_Master object in each of domain controller 110b, 110c, and 110d has been updated to identify domain controller 110c. Thus, domain controller 110a, upon replicating in a value for FSMO_Role_Owner identifying domain controller 110c as the RID Master role owner, abandons all attempts to operate as RID Master and recognizes domain controller 110c as the current RID Master.

Figure 9:
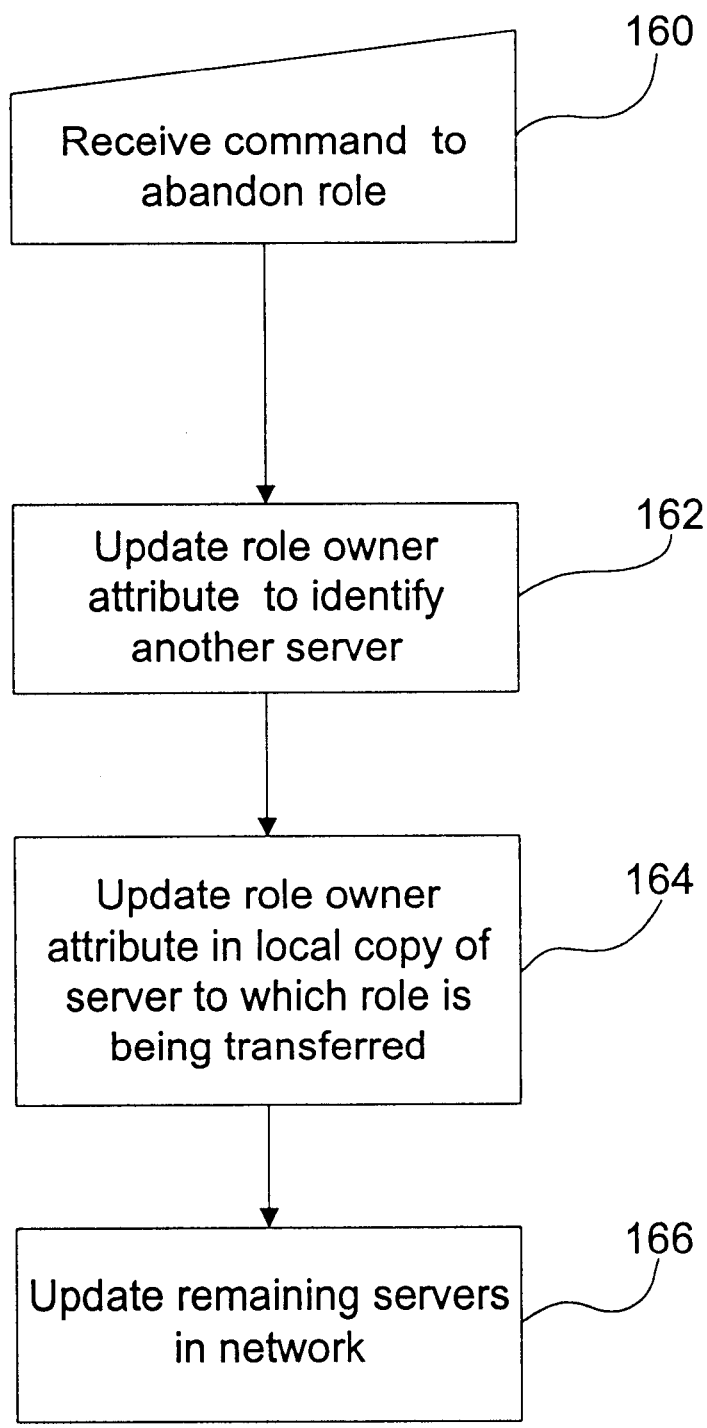
FIG. 9 is a flow diagram of a process in accordance with the present invention of abandoning a FSMO role.

Of course, in some situations it is appropriate to abandon FSMO roles. Abandoning FSMO roles is necessary particularly when a domain controller is going to be taken off-line and there is no time for transferring the FSMO roles by normal procedures. Prior to removing a domain controller from the network, it is appropriate to abandon all of the roles currently held by the particular machine. Doing so allows for any network-wide tasks which are currently being performed by the domain controller to continue to be provided on the network. FIG. 9 provides a diagram of the FSMO role abandon process. As shown, an administrator or similar person, at step 160 issues to the FSMO role owner a command to abandon its FSMO role. The FSMO role owner, at step 162, updates the role owner attribute in its local copy of the directory service to identify another domain controller in the network. The particular domain controller to which the role owner is changed is chosen at random. At step 164, the change in role ownership is replicated to the domain controller to which role ownership is being transferred. Finally, at step 166, the remaining servers in the network are updated with the change.

Again, the process of abandoning master role ownership may be explained by way of example. Referring back to FIG. 5, assume that domain controller 110a is the current owner of two roles, RID Master and Schema Master. Thus, in local copy 112a of the directory service located on each of domain controllers 110a, 110b, 110c, and 110d, the FSMO_Role_Owner attributes located on the RID-Master and Schema_Master objects identify domain controller 110a. If domain controller 110a is showing signs of instability, it may be necessary to bring domain controller 110a down. Prior to doing so, it is wise to abandon all of the FSMO roles presently held by domain controller 110a. Thus, a command is issued by an administrator to domain controller 110a to abandon all roles which it currently holds. Domain controller 110a recognizes by way of local copy 112a of the directory service that it is identified as both RID Master role owner and Schema Master role owner. Domain controller 110a updates local copy 112a of the directory service to identify another of the network domain controllers, either 110b, 110c, or 110d, as the new RID Master and Schema Master role owner. The particular domain controller is chosen at random. For this example, it can be assumed that domain controller 110c is selected at random. The FSMO Role Owner attributes on the RID Master and Schema Master objects are updated in local copy 112a of domain controller 110a to identify domain controller 110c. Thereafter, the FSMO_Role_Owner attribute on the RID-Master and Schema-Master objects in domain controller 110c is updated via urgent replication to identify domain controller 110c. Domain controllers 110b and 110d are updated to identify domain controller 110c as the current RID Master and Schema Master role owner via replication.

Those skilled in the art understand that computer readable instructions for performing the above described processes can be generated and stored on a computer readable medium such as a floppy disk or CD-ROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

While the invention has been described and illustrated with reference to specific embodiments, those skilled in the art will recognize that modification and variations may be made without departing from the principles of the invention as described above and set forth in the following claims. In particular, the role owner attribute may be stored in any means that is consistent across domain controllers. Preferably, however, a role owner attribute is stored in a directory service. Also, updates of a role owner attribute may be made by any means, although preferably the updates are made using the replication features of a directory service. Accordingly, reference should be made to the appended claims as indicating the scope of the invention.

What is claimed is:

1. In a network comprising a plurality of servers, wherein each of the servers is capable of performing a predefined task, a system for identifying a master server to exclusively perform the predefined task, comprising:

a first data object having an attribute for identifying one of the plurality of servers as a master server to exclusively perform the predefined task; and a second object used by a master server to perform the predefined task, wherein the value of the second object changes during performance of the predefined task, wherein the first data object and second data object are replicated in each of the plurality of servers, and transferring exclusive authority to perform the predefined task involves updating the attribute on a first server presently having exclusive authority to perform the predefined task to identify a second server to which exclusive authority to perform the predefined task is being transferred, updating the attribute on the second server to identify the second server as having exclusive authority to perform the predefined task, and updating the second object on the second server to the value of the second object on the first server when the attribute on the first server was changed to identify the second server as having exclusive authority to perform the predefined task.

2. The system of claim 1 wherein the data object is stored in a directory service database.

3. The system of claim 1 wherein the predefined task is allocating pools of unique identifiers.

4. The system of claim 1 wherein the predefined task is making changes to a domain name space.

5. The system of claim 1 wherein the predefined task is advertising as having the capability to support clients running earlier versions of a network operating system.

6. The system of claim 1 wherein the predefined task is updating unique identifiers in cross-domain object references.

7. The system of claim 2 wherein the predefined task is updating the directory service's schema.

8. In a network comprising a plurality of servers, wherein each of the plurality of servers is capable of performing a predefined network-wide task, a system for dynamically identifying a master server to exclusively perform the predefined network-wide task, comprising:

a replicated database storing a role owner attribute identifying a master server to exclusively perform the predefined network-wide task and a second object used by a master server to perform the predefined task wherein the value of the second object changes during performance of the predefined task, and wherein a local copy of the database is stored on each of the plurality of servers;

a requesting server to request assignment of the master server role to the requesting server; and the master server operative to receive the request, change the role owner attribute in the local copy of the replicated database to identify the requesting server, forward an updated attribute to the requesting server to be stored in the local copy of the replicated database located on the requesting server, and forward an updated second object to the second server wherein the value of the second object is the value of the second object on the master server when the attribute was updated to identify the requesting server.

9. The system of claim 8, further comprising:

at least a third server, wherein the third server replicates the role owner attribute from the local copy of the replicated database located on the requesting server or the master server.

10. In a network having a plurality of servers, wherein each of the plurality of servers is capable of performing a predefined network-wide task and has a replicated database stored thereon with a master role owner attribute for identifying a master with exclusive authority to perform a predefined network-wide task and with a second data object used by a master to perform the predefined task, wherein the value of the second object changes during performance of the predefined task, a method of transferring ownership of the master role from a current master server in the plurality of servers to a requesting server in the plurality of servers, comprising:

communicating a request to transfer ownership of the master server role from the current master server to a requesting server;

if the current master server is available to be replaced as master server, updating the master role owner attribute located in the local copy of the replicated database located on the master server to a value identifying the requesting server, updating the master role owner attribute on the local copy of the replicated database located on the requesting server to a value identifying the requesting server, and updating the second object on the local copy of the requesting server to the value of the second object on the master server when the attribute was changed to refer to the requesting server; and replicating the local copy of the replicated database from the master server and requesting server to other servers in the plurality of servers.

11. A computer-readable medium having computer-executable instructions for performing the steps recited in claim 10.

12. In a network having a plurality of servers, wherein each server is capable of performing a predefined network-wide task and has a replicated database stored thereon with a master role owner attribute for identifying a master server role owner in the plurality of servers with exclusive authority to perform a predefined network-wide task, the plurality of servers including a current master server identified by the master role owner attribute and a second server, a method of controlling the master server role owner, comprising the following steps:

floating the role of master server from the current master server to the second server;

if the current master server has been taken off-line, seizing the role of master server;

if the current master server was previously taken off-line, restoring the current master server to the network and prior to beginning operation as the master server, verifying that another server is not operating as the master server; and abandoning the role of master server.

13. The method of claim 12, wherein the step of floating the role of master server from the-current master server to the second server comprises the following steps:

communicating a request from the second server to the current master server to transfer ownership of the master server role to the second server;

if the current master server is not available to be transferred, returning an error to the second server; and if the current master server is available for transferring the role of master server, updating the master server role owner attribute stored in a local copy of a directory services database located on the master server to identify the second server, updating the master server role owner attribute in the local copy of the directory services database located on the second server, to identify the second server as the master server, and updating the master server role owner attribute on the local copies of all servers in the plurality of servers to identify the second server as the master server.

14. The method of claim 12, wherein the step of seizing the role of master server comprises the following steps:

receiving, at the second server, a command to seize ownership of the master server role;

updating the master server role owner attribute located locally on the second server to identify the second server; and updating the master server role owner attribute in the local copies of the replicated database located on other servers in the plurality of servers to identify the second server as the master server.

15. The method of claim 12, wherein the step of restoring the current master server and prior to beginning operation as the master server, verifying that another server is not operating as the master server, comprises the following steps:

retrieving to the current master server from the replicated database located on another server in the plurality of servers, the master server role owner attribute;

if the replicated master server role owner attribute identifies the current master server, initiating operation as the current master server; and if the replicated master server role owner attribute identifies the second server as the master server role owner, updating the master server role owner attribute in the local copy of the replicated database located on the current master server to identify the second server.

16. The method of claim 12, wherein the step of abandoning the role of master server comprises the following steps:

receiving a command to abandon the master server role;

updating the master server role owner attribute on the master server to identify another server in the plurality of servers; and updating the master server role owner attribute in the local copies of the replicated database located on each server in the plurality of servers to correspond with the master server role owner attribute located on the master server.

17. A data structure stored on one or more computer-readable media, the data structure comprising:

a first data object having an attribute for identifying a master server in a plurality of servers to exclusively perform a predefined task, and a second object used by a master server to perform the predefined task, wherein the value of the second object changes during performance of the predefined task, wherein the first data object and second data object are replicated so as to be accessible to each server in the plurality of servers, and transferring exclusive authority to perform the predefined task involves updating the attribute on a first server presently having exclusive authority to perform the predefined task to identify a second server to which exclusive authority to perform the predefined task is being transferred, updating the attribute on the second server to identify the second server as having exclusive authority to perform the predefined task, and updating the second object on the second server to the value of the second object on the first server when the attribute on the first server was changed to refer to the second server.

18. A computer-readable media having stored thereon instructions for performing steps comprising:

updating in a local copy of a distributed database located on a first server an attribute identifying a master server with exclusive authority to perform a predefined task to identify a second server to which exclusive authority to perform the predefined task is being transferred;

updating in a local copy of the distributed database located on a second server the attribute identifying a master server to identify the second server as having exclusive authority to perform the predefined task;

and updating in a local copy of the distributed database located on the second server a second object to the value for the second object on the first server when the attribute on the first server was changed to refer to the second server.

19. The computer-readable medium of claim 18, further comprising the step of communicating to other servers that exclusive authority for performing a task has been moved from a first sever to a second server.

20. In a network having a plurality of servers, wherein each of the plurality of servers is capable of performing a predefined network-wide task and has a replicated database stored thereon with a master role owner attribute for identifying a master with exclusive authority to perform the predefined network-wide task and with a second data object used by a master server to perform the predefined task, wherein the value of the second object changes during performance of the predefined task, a method of transferring ownership of the master role, comprising:

at a first server having a role owner attribute identifying a second server as the master server, communicating a request to the second server to transfer ownership of the master server role to the first server;

at the second server, receiving the request to transfer ownership of the master server role and verifying in the database replicated on the second server that the master role owner attribute identifies the second server as the master server role owner; and at the second server, if the role owner attribute does not identify the second server as the master server role owner, communicating to the first server, the server identified in the master role owner attribute as the master server role owner.

21. The method of claim 20, further comprising:

at the first server, receiving from the second server the identity of the server identified by the second server as the master server role owner, and forwarding to the server identified by the second server as the master server role owner a request to transfer ownership of the master server role.

22. The method of claim 20, wherein the second server communicates the identity of the server identified by the second server as the master server role owner if the copy of the role owner attribute on the second server is more recent than the copy of the role owner attribute on the first server.

23. The method of claim 20, further comprising, at the second server, if the role owner attribute identifies the second server as the master server role owner, changing the value of the role owner attribute to identify the first server and forwarding to the first server the value of the second object when the value of the role owner attribute was changed to identify the first server.

24. The method of claim 23, further comprising, at the first server changing the value of the role owner attribute to identify the first server as the role owner and changing the value of the second object to the value of the second object on the second server when the value of the role owner attribute was changed to identify the first server.

* * * * *